(12) United States Patent
Nagashima et al.

(10) Patent No.: US 12,035,056 B2
(45) Date of Patent: Jul. 9, 2024

(54) VEHICULAR EXTERIOR MEMBER AND FAR-INFRARED CAMERA EQUIPPED VEHICULAR EXTERIOR MEMBER

(71) Applicant: AGC Inc., Tokyo (JP)

(72) Inventors: Tatsuo Nagashima, Chiyoda-ku (JP); Kenji Kitaoka, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 17/647,193

(22) Filed: Jan. 6, 2022

(65) Prior Publication Data

US 2022/0132047 A1    Apr. 28, 2022

Related U.S. Application Data

(63) Continuation of application No. PCT/JP2020/024384, filed on Jun. 22, 2020.

(30) Foreign Application Priority Data

Jul. 24, 2019  (JP) .................................. 2019-136326

(51) Int. Cl.
*H04N 23/90* (2023.01)
*B60J 1/02* (2006.01)
(Continued)

(52) U.S. Cl.
CPC ............... *H04N 23/90* (2023.01); *B60J 1/02* (2013.01); *C03C 3/078* (2013.01); *C03C 4/10* (2013.01);
(Continued)

(58) Field of Classification Search
CPC ...... H04N 23/90; H04N 13/239; H04N 23/54; H04N 23/56; B60J 1/02; C03C 3/078;
(Continued)

(56) References Cited

U.S. PATENT DOCUMENTS 8,544,933 B1 * 10/2013 Fuller .................... B60J 3/0208
296/97.8
10,336,163 B2    7/2019 Sakamoto et al.
(Continued)

FOREIGN PATENT DOCUMENTS

CN        101037099 A      9/2007
CN        106103158 A     11/2016
(Continued)

OTHER PUBLICATIONS

International Search Report dated Aug. 11, 2020 in PCT/JP2020/024384 filed on Jun. 22, 2020, 3 pages.

*Primary Examiner* — Nasim N Nirjhar
(74) *Attorney, Agent, or Firm* — Oblon, McClelland, Maier & Neustadt, L.L.P.

(57) ABSTRACT

The present invention aims to provide a vehicular exterior member that is excellent in strength and cost, and sufficiently ensures a viewing field of sharpness of a thermal image obtained by a far-infrared camera. A vehicular exterior member that includes a light blocking region and is configured to be attached to a vehicle equipped with a far-infrared camera. The vehicular exterior member further includes, in the light blocking region, a far-infrared ray transmitting region having an opening and a far-infrared ray transmitting member disposed in the opening. An average transmittance of far-infrared rays having a wavelength ranging from 8 to 13 μm of the far-infrared ray transmitting member is equal to or larger than 25%. A length of the longest straight line in straight lines connecting any desired two points on a surface on a vehicle exterior side of the far-infrared ray transmitting member is equal to or smaller than 80 mm. A diameter of the largest circle in circles formed in a projected shape obtained by projecting the far-infrared ray transmitting member in an optical axis direction of the far-infrared camera is equal to or larger than (Continued)

12 mm. An average thickness of the far-infrared ray transmitting member is equal to or larger than 1.5 mm.

20 Claims, 8 Drawing Sheets

(51) Int. Cl.

| | | |
|---|---|---|
| *B60R 11/00* | (2006.01) | |
| *B60R 11/04* | (2006.01) | |
| *C03C 3/078* | (2006.01) | |
| *C03C 4/10* | (2006.01) | |
| *C03C 17/36* | (2006.01) | |
| *G02B 1/115* | (2015.01) | |
| *G02B 1/14* | (2015.01) | |
| *H04N 13/239* | (2018.01) | |
| *H04N 23/54* | (2023.01) | |
| *H04N 23/56* | (2023.01) | |

(52) U.S. Cl.
CPC ...... *C03C 17/3621* (2013.01); *C03C 17/3628* (2013.01); *C03C 17/3634* (2013.01); *C03C 17/3649* (2013.01); *H04N 13/239* (2018.05); *H04N 23/54* (2023.01); *H04N 23/56* (2023.01); *B60R 2011/0026* (2013.01); *B60R 11/04* (2013.01); *C03C 2217/268* (2013.01); *C03C 2217/285* (2013.01); *C03C 2217/288* (2013.01); *C03C 2217/73* (2013.01); *C03C 2218/15* (2013.01); *G02B 1/115* (2013.01); *G02B 1/14* (2015.01)

(58) Field of Classification Search
CPC ... C03C 4/10; C03C 17/3621; C03C 17/3628; C03C 17/3634; C03C 17/3649; C03C 2217/268; C03C 2217/285; C03C 2217/288; C03C 2217/73; C03C 2218/15; C03C 17/22; C03C 17/28; C03C 17/3411; C03C 27/10; C03C 2217/734; C03C 3/323; B60R 11/04; B60R 2011/0026; B60R 13/04; B60R 1/00; B60R 2300/106; G02B 1/115; G02B 1/14
See application file for complete search history.

(56) References Cited

U.S. PATENT DOCUMENTS

| | | | |
|---|---|---|---|
| 2003/0169491 | A1 | 9/2003 | Bender et al. |
| 2007/0216768 | A1 | 9/2007 | Smith et al. |
| 2011/0249344 | A1* | 10/2011 | Nagatoshi ...... G02B 15/145529 359/680 |
| 2016/0259102 | A1* | 9/2016 | Taka ...................... G02B 5/208 |
| 2016/0284075 | A1* | 9/2016 | Phan .................... H04N 23/698 |
| 2017/0015180 | A1* | 1/2017 | Sakamoto ......... B32B 17/10348 |
| 2020/0401010 | A1* | 12/2020 | Watanabe ................ G02F 1/19 |
| 2021/0122671 | A1* | 4/2021 | Hart ........................ G02B 1/14 |

FOREIGN PATENT DOCUMENTS

| | | |
|---|---|---|
| GB | 2 271 139 A | 4/1994 |
| JP | 2008-236062 A | 10/2008 |
| JP | 2015-175745 A | 10/2015 |
| JP | 2016-001870 A | 1/2016 |
| JP | 2018-119856 A | 8/2018 |
| WO | WO 2015/137518 A1 | 9/2015 |

* cited by examiner

VEHICULAR EXTERIOR MEMBER AND FAR-INFRARED CAMERA EQUIPPED VEHICULAR EXTERIOR MEMBER

CROSS-REFERENCE TO RELATED APPLICATION(S)

This application is a continuation of International Application No. PCT/JP2020/024384, filed on Jun. 22, 2020, the entire contents of which are incorporated herein by reference.

FIELD

The present invention relates to a vehicular exterior member and a far-infrared camera equipped vehicular exterior member.

BACKGROUND

In recent years, various automatic sensors have been attached for the purpose of improving safety of vehicles in some cases. Examples of the sensors attached to vehicles include cameras, light detecting and ranging (LiDAR) sensors, millimeter wave radars, and infrared sensors.

Infrared rays are classified into near-infrared rays (e.g., wavelength ranging from 0.7 µm to 2 µm), mid-infrared rays (e.g., wavelength ranging 3 µm to 5 µm), and far-infrared rays (e.g., wavelength ranging 8 µm to 13 µm). Examples of the infrared sensors that detect those infrared rays include touch sensors, near-infrared cameras, and LiDAR sensors for detecting near-infrared rays, gas analyzers and mid-infrared spectroscopic analyzers (functional group analyzers) for detecting mid-infrared rays, and night visions and thermo viewers (hereinafter, referred to as far-infrared cameras) for detecting far-infrared rays.

Windowpanes of vehicles generally do not transmit far-infrared rays having a wavelength ranging from 8 µm to 13 µm. The far-infrared cameras have been often installed inside front grilles outside vehicle cabins such as a case described in Patent Literature 1. The far-infrared cameras to be installed outside vehicle cabins require more complex structures for achieving robustness, a water proof property, a dust proof property, and the like. As a result, the costs are increased. Such a problem can be solved by installing the far-infrared cameras inside vehicle cabins, particularly in working areas of windshield wipers, because the far-infrared cameras are protected by windowpanes. The far-infrared cameras, however, have not been installed inside vehicle cabins because of a far-infrared ray transmittance of the windowpanes as described above.

To cope with such problems, Patent Literature 2 discloses a window member including a member that can transmit infrared rays and is charged into a through hole opened on a part of a windshield.

CITATION LIST

Patent Literature

Patent Literature 1: US Patent Application Publication No. 2003/0169491
Patent Literature 2: UK Patent Application Publication No. GB2271139

SUMMARY

Technical Problem

In the window member described in Patent Literature 2, a through hole being too large causes a decrease in strength of the window member and an increase in amount of charged infrared ray transmissible member, resulting in an increase in a cost. In contrast, a through hole being too small causes a decrease in radiation amount of far-infrared rays that reach the far-infrared camera. As a result, a luminance reduction and a blur occur in obtained thermal images. In other words, sharpness of the thermal image is decreased. In Patent Literature 2, the size of the through hole is, however, not sufficiently examined. It has not yet been clear about a concrete structure of the window member that has practically sufficient strength, cost, and a viewing field of the far-infrared camera.

In view of such problems, the present invention is made and aims to provide a vehicular exterior member such as a window member that is excellent in strength and cost, and sufficiently ensures sharpness of a thermal image obtained by a far-infrared camera.

The present invention also aims to provide a far-infrared camera equipped vehicular exterior member, which is the vehicular exterior member to which a far-infrared camera is attached.

Solution to Problem

To solve the problem above, a vehicular exterior member of the present disclosure includes a light blocking region and is configured to be attached to a vehicle equipped with a far-infrared camera. The vehicular exterior member includes: in the light blocking region, a far-infrared ray transmitting region having an opening, and a far-infrared ray transmitting member that is disposed in the opening, wherein an average transmittance of far-infrared rays having a wavelength ranging from 8 to 13 µm of the far-infrared ray transmitting member is equal to or larger than 25%, a length of the longest straight line, in straight lines connecting any desired two points on a surface on a vehicle exterior side of the far-infrared ray transmitting member, is equal to or smaller than 80 mm, and a diameter of the largest circle, in circles formed in a projected shape obtained by projecting the far-infrared ray transmitting member in an optical axis direction of the far-infrared camera, is equal to or larger than 12 mm, and an average thickness of the far-infrared ray transmitting member is equal to or larger than 1.5 mm.

In one aspect of the vehicular exterior member of the present disclosure, the vehicular exterior member may be a vehicular window member.

In one aspect of the vehicular exterior member of the present disclosure, the vehicular exterior member may be an exterior member for a vehicular pillar.

In one aspect of the vehicular exterior member of the present disclosure, the far-infrared ray transmitting member may include at least one material selected from the group consisting of ZnS, Ge, Si, and chalcogenide glass.

In one aspect of the vehicular exterior member of the present disclosure, at least one of the surface on the vehicle exterior side and a surface on a vehicle interior side of the far-infrared ray transmitting member may be provided with an antireflection film including one to twelve layers, and the layer on the most vehicle exterior side of the antireflection film is a diamond-like carbon film.

In one aspect of the vehicular exterior member of the present disclosure, the surface on the vehicle exterior side of the far-infrared ray transmitting member may be formed flush with a surface on the vehicle exterior side of the light blocking region.

In one aspect of the vehicular exterior member of the present disclosure, the far-infrared ray transmitting member may be attached with at least one of a urethane-based adhesive and an acrylic adhesive.

In one aspect of the vehicular exterior member of the present disclosure, an area of the opening on a surface on a vehicle interior side may be smaller than the area of the opening on a surface on the vehicle exterior side.

In one aspect of the vehicular exterior member of the present disclosure, a visible light transmitting region may be provided in the light blocking region having a visible light transmittance equal to or larger than 70%.

A far-infrared camera equipped vehicular exterior member of the present disclosure comprises: the vehicular exterior member; and a far-infrared camera, wherein the far-infrared camera is attached to the vehicular exterior member in such a manner as to be capable of imaging an external thermal image through the far-infrared ray transmitting region.

The far-infrared camera equipped vehicular exterior member in one aspect of the present disclosure, may comprises the vehicular exterior member; a far-infrared camera; and a visible light camera, wherein the far-infrared camera is attached to the vehicular exterior member in such a manner as to be capable of imaging an external thermal image through the far-infrared ray transmitting region, and the visible light camera is attached to the vehicular exterior member in such a manner as to be capable of imaging an external image through the visible light transmitting region.

In one aspect of the far-infrared camera equipped vehicular exterior member of the present disclosure, an optical axis of the far-infrared camera and the optical axis of the visible light camera may be substantially in parallel, and a distance between the optical axes is equal to or smaller than 20 cm.

In one aspect of the far-infrared camera equipped vehicular exterior member of the present disclosure, the visible light camera may be a stereo camera including a first camera and a second camera, and the far-infrared camera is positioned between the first and the second cameras.

In one aspect of the far-infrared camera equipped vehicular exterior member of the present disclosure, the far-infrared camera may be attached to the vehicular exterior member with a bracket interposed therebetween, and an inside of the bracket is kept vacuum or filled with a heat insulator.

In one aspect of the far-infrared camera equipped vehicular exterior member of the present disclosure, the far-infrared camera is attached to the vehicular exterior member with a bracket interposed therebetween, and the far-infrared camera equipped vehicular exterior member further includes a temperature controller for adjusting a temperature inside the bracket.

Advantageous Effects of Invention

The present invention provides the vehicular exterior member such as the window member that is excellent in strength and cost, and sufficiently ensures the sharpness of the thermal image obtained by the far-infrared camera. The present invention provides the far-infrared camera equipped vehicular exterior member, which is the vehicular exterior member to which the far-infrared camera is attached.

DESCRIPTION OF EMBODIMENTS

The following describes embodiments according to the present invention. The present invention is not limited to the following embodiments. The embodiments are schematically illustrated on the accompanying drawings for clearly describing the present invention. The drawings do not necessarily correctly illustrate the actual sizes and scales.

Figure 1:
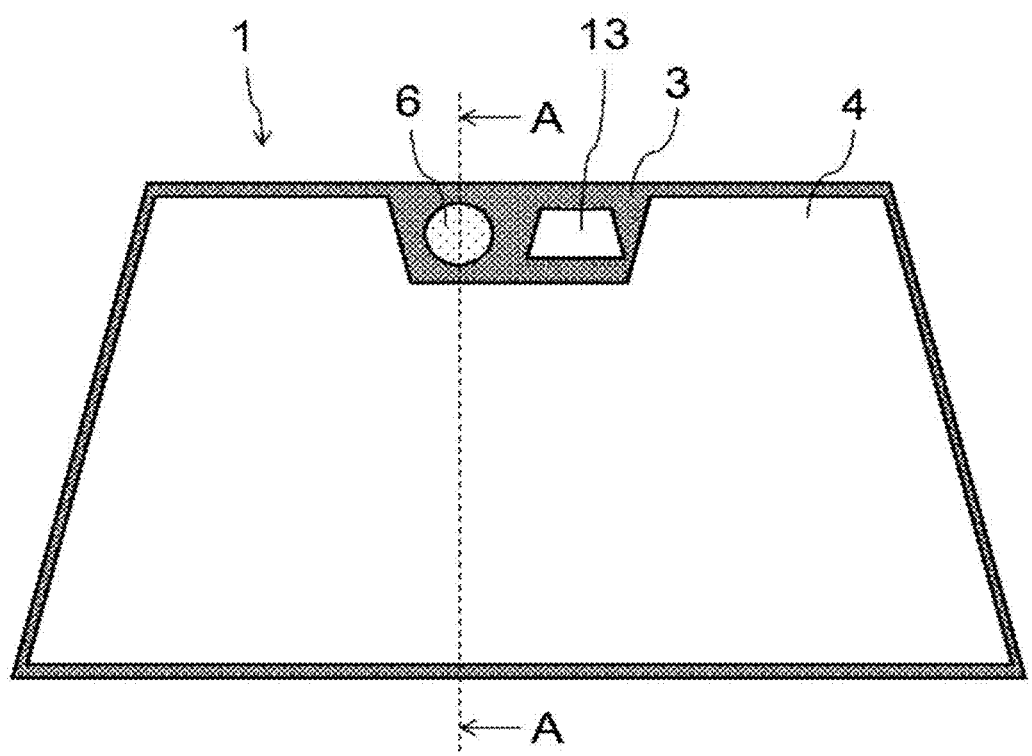
FIG. 1 is a schematic plane view of an embodiment of a vehicular exterior member according to the present invention.
Figure 2:
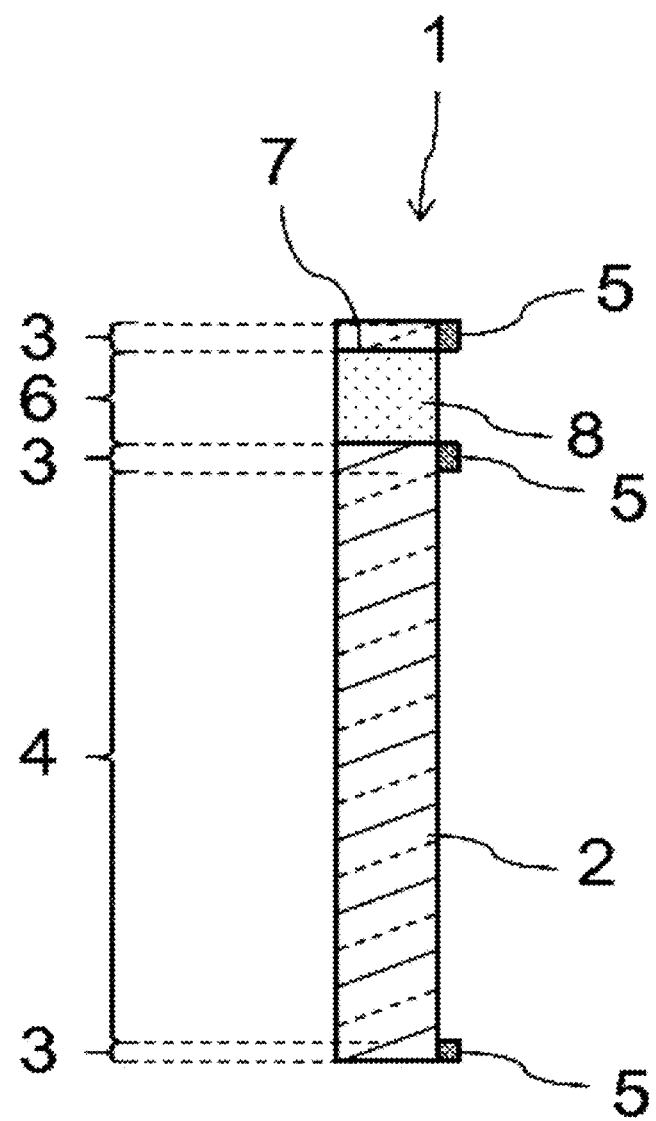
FIG. 2 is a cross-sectional view along line A-A in FIG. 1.

FIG. 1 is a schematic plane view of an embodiment of a vehicular exterior member according to the present invention. FIG. 2 is a cross-sectional view along line A-A in FIG. 1. The vehicular exterior member according to the embodiment is a window member applied to a front windshield of a vehicle, and particularly a window member attached to a vehicle equipped with a far-infrared camera.

The embodiment of the vehicular exterior member of the present invention is not limited to the window member applied to the front windshield of a vehicle. For example, the window member may be applied to a rear windshield or a side windshield. The vehicular exterior member may be applied to an exterior member for other than the window member, for example may be applied to an exterior member or a pillar.

A glass base body 2 included in a window member 1 in the embodiment may be a single plate glass or a laminated glass. The glass base body 2 may be subjected to strengthening processing such as physical strengthening and chemical strengthening.

The window member 1 in the embodiment includes a light blocking region 3. The window member 1 generally includes a light transmitting region 4 at its central portion for ensuring the driver's viewing field and the light blocking region 3 surrounding the light transmitting region 4. As illustrated in FIG. 1, the far-infrared camera and other sensors being generally attached to the upper portion of the window member 1, the light blocking region 3 is also provided around the region where these sensors are attached. It is preferable that the light blocking region 3 be provided in such a manner as described above because the various sensors are protected from sunlight. The light blocking region 3 provided in such a manner as described above is also preferable from a design point of view because the light blocking region 3 causes wiring of the various sensors not to be seen from the outside of the vehicle.

The light blocking region 3 is formed by providing a light blocking layer 5 on the glass base body 2 constituting the window member 1. The light blocking region 3 corresponds to the region in which the light blocking layer 5 is provided on the glass base body 2 in a plan view of the window member 1.

A ceramic light blocking layer or a light blocking film can be used for the light blocking layer 5, for example. For the ceramic light blocking layer, a ceramic layer can be used that includes a known material, such as a black ceramic layer. For the light blocking film, a light blocking polyethylene terephthalate (PET) film, a light blocking polyethylene naphthalate (PEN) film, and a light blocking polymethylmethacrylate (PMMA) film can be used, for example.

The light blocking layer 5, which is generally formed on the surface on a vehicle interior side of the glass base body 2, may be formed on the surface on a vehicle exterior side of the glass base body 2. When the glass base body 2 is a laminated glass, the light blocking layer 5 may be formed between two glasses forming the laminated glass.

The window member 1 in the embodiment includes a far-infrared ray transmitting region 6 in the light blocking region 3.

The far-infrared ray transmitting region 6 has an opening 7 formed in the light blocking region 3 and a far-infrared ray transmitting member 8 disposed in the opening 7.

When an average transmittance of far-infrared rays having a wavelength ranging from 8 to 13 μm of the far-infrared ray transmitting member 8 is smaller than 15%, the far-infrared ray transmittance in the far-infrared ray transmitting region 6 is insufficient. As a result, the far-infrared camera does not sufficiently demonstrate its performance. The average transmittance of the far-infrared rays having a wavelength ranging from 8 to 13 μm of the far-infrared ray transmitting member 8 in the embodiment is equal to or larger than 25%, preferably equal to or larger than 40%, more preferably equal to or larger than 50%, furthermore preferably equal to or larger than 70%, and particularly preferably equal to or larger than 85%. It is essential for increasing the average transmittance of far-infrared rays 85% or more to provide an antireflection film.

The material of the far-infrared ray transmitting member is not limited to a specific one as long as the transmittance described above is satisfied. Examples of the material include ZnS, Ge, Si, and chalcogenide glass.

A preferable composition, which is expressed as an atomic percentage, of the chalcogenide glass is as follows:
(Ge+Ga) is 7% to 25%;
Sb is 0% to 35%;
Bi is 0% to 20%;
Zn is 0% to 20%;
Sn is 0% to 20%;
Si is 0% to 20%;
La is 0% to 20%;
(S+Se+Te) is 55% to 80%;
Ti is 0.005% to 0.3%;
(Li+Na+K+Cs) is 0% to 20%; and
(F+Cl+Br+I) is 0% to 20%. The glass preferably has a glass transition point (Tg) of 140° C. to 550° C.

The method of attaching the far-infrared ray transmitting member 8 to the opening 7 is not limited to a specific one. For example, both can be attached to each other with an adhesive such as a urethane-based adhesive and/or an acrylic adhesive. In general, a difference in thermal expansion between the windowpane of the vehicle and the far-infrared ray transmitting member is large. It is thus preferable to select an adhesive that can lessen the difference, and is excellent in adhesive strength, impact resistance, and environmental resistance. The adhesion surface on the vehicle exterior side may be covered with a resin, for example, to enhance the environmental resistance.

A gap of 0.2 to 1.5 mm is preferably provided between the far-infrared ray transmitting member 8 and the opening 7. When the gap is smaller than 0.2 mm, the thermal expansion difference between the windowpane of the vehicle and the far-infrared ray transmitting member may cause the windowpane to be optically distorted or the windowpane and/or the far-infrared ray transmitting member to be damaged. The gap is more preferably equal to or larger than 0.3 mm, and furthermore preferably equal to or larger than 0.5 mm. When the gap is larger than 1.5 mm, the adhesive strength and the impact resistance may be lessened. The gap is more preferably equal to or smaller than 1.2 mm, and furthermore preferably equal to or smaller than 1.0 mm.

As illustrated in FIG. 2, the surface on the vehicle exterior side of the far-infrared ray transmitting member 8 is preferably formed flush with the surface on the vehicle exterior side of the light blocking region 3. When the surface on the vehicle exterior side of the far-infrared ray transmitting member 8 is not formed flush with the surface on the vehicle exterior side of the light blocking region 3, and the vehicular exterior member 100 is applied to the front windshield of the vehicle, for example, a wiping effect of the wipers may be lessened. Even when the vehicular exterior member 100 is applied to ones other than the front windshield, a design property of the vehicle may be reduced due to a step, and dust may be accumulated on the step, for example. The far-infrared ray transmitting member is preferably formed corresponding to a curved shape of the vehicular exterior member to which the far-infrared ray transmitting member is applied. The method of forming the far-infrared ray transmitting member is not limited to a specific one. Polishing or molding is selected in accordance with the curved surface shape and the material.

The surface on the vehicle exterior side and/or the surface on the vehicle interior side of the far-infrared ray transmitting member 8 may be coated. For example, the surface on the vehicle exterior side or the vehicle interior side, or both sides, i.e., at least one of the surfaces on the vehicle exterior side and the surface on the vehicle interior side may be provided with an antireflection film. The antireflection film is preferably including one to twelve layers. The material is not limited to a specific one. Preferable examples of the material include Ge, Si, ZnS, ZnSe, $As_2S_3$, $As_2Se_3$, metal oxides ($Al_2O_3$, $Bi_2O_3$, $CeO_2$, CuO, $HfO_2$, MgO, SiO, $SiO_2$, TiO, $TiO_2$, $Ti_2O_3$, $Y_2O_3$, and $ZrO_2$), hydrogenated carbon, diamond-like carbon (DLC), and metal fluorides ($MgF_2$, $CaF_2$, $SrF_2$, $BaF_2$, $PbF_2$, $LaF_3$, and $YF_3$). The layer on the most vehicle exterior side is preferably a film that has a Mohs hardness of 7 or more and a high far-infrared ray transmittance from the viewpoint of scratch resistance. The layer on the most vehicle exterior side is particularly preferable a diamond-like carbon film.

The shape of the far-infrared ray transmitting member 8 is not limited to a specific one. The shape is preferably a plate-like shape corresponding to the shape of the opening 7. For example, when the shape of the opening 7 is circle, the far-infrared ray transmitting member 8 preferably has a disk (columnar) shape.

Figure 3:
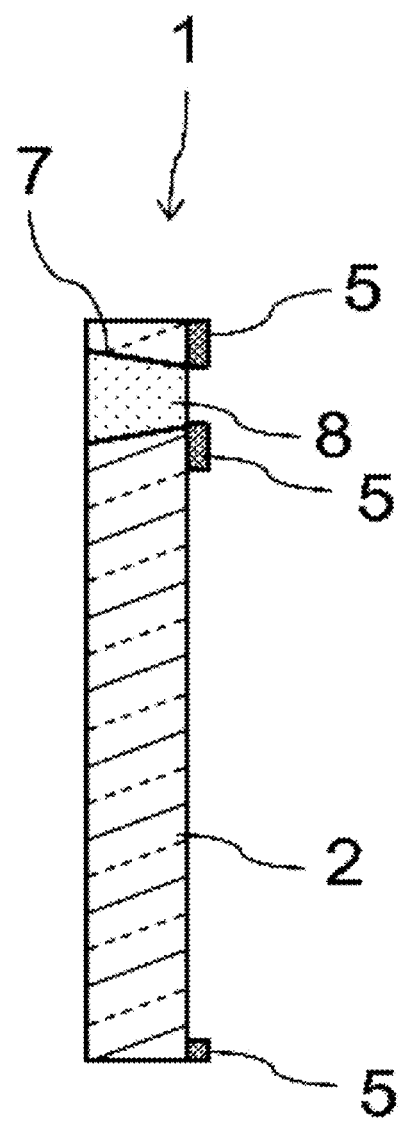
FIG. 3 is a schematic cross-sectional view of the vehicular exterior member in the embodiment of the present invention.
Figure 4:
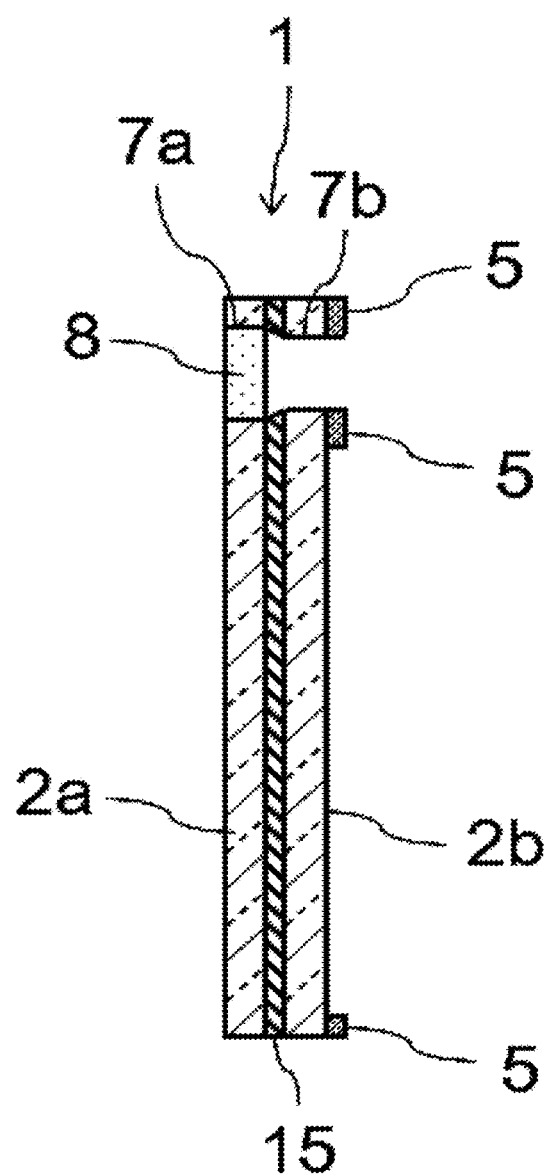
FIG. 4 is another schematic cross-sectional view of the vehicular exterior member in the embodiment of the present invention.

As illustrated in FIG. 3, in the window member 1 in the embodiment, the area of the opening 7 on the surface on the vehicle interior side is smaller than the area of the opening 7 on the surface on the vehicle exterior side. Likewise, the area of the far-infrared ray transmitting member 8 on the surface on the vehicle interior side is preferably smaller than that on the surface on the vehicle exterior side in relation to the shape thereof. This structure increases the strength against the impact from the vehicle exterior side. As illustrated in FIG. 4, when the glass base body of the window member in the embodiment is a laminated glass including a first glass 2a (on the vehicle exterior side) and a second glass 2b (on the vehicle interior side), the area of an opening 7a of the first glass 2a is set to be larger than the area of an opening 7b of the second glass 2b, and the far-infrared ray transmitting member 8 having a size fitted to the size of the opening 7a of the first glass 2a is disposed in the opening 7a of the first glass 2a.

The thickness of the far-infrared ray transmitting member 8 is equal to or larger than 1.5 mm, preferably equal to or larger than 2.0 mm, and more preferably equal to or larger than 3.0 mm from the viewpoint of strength. The thickness of the far-infrared ray transmitting member 8 is not limited to a specific one as long as the average transmittance of the far-infrared rays having a wavelength ranging from 8 to 13 μm is secured. The thickness is typically equal to or smaller than 5.0 mm.

The far-infrared ray transmitting member may have a lens shape to achieve both widening a viewing angle of the far-infrared camera and improving mechanical characteristics thereof, for example. Such a structure is preferable because far-infrared rays can be efficiently converged even when the area of the far-infrared ray transmitting member is small. In this case, the number of far-infrared ray transmitting members having a lens shape is preferably one to three. Typically, two is preferable. It is particularly preferable that the far-infrared ray transmitting member having a lens shape be preliminarily aligned and modularized, and be integrated with a housing or a bracket that adhesively bonds the far-infrared camera to the vehicular exterior member.

When the surface on the vehicle exterior side of the far-infrared ray transmitting member 8 is too large, the strength of the window member is insufficient. The length of the longest straight line, in the straight lines connecting any desired two points on the surface on the vehicle exterior side of the far-infrared ray transmitting member 8 in the embodiment, is equal to or smaller than 80 mm, preferably equal to or smaller than 70 mm, and more preferably equal to or smaller than 65 mm. When the shape of the surface on the vehicle exterior side of the far-infrared ray transmitting member 8 is circle, the length is the diameter of the circle.

A radiation amount of far-infrared rays reaching the far-infrared camera attached to the window member 1 in the embodiment depends on the size of a largest circle, the largest circle is largest in circles formed inside a projected shape obtained by projecting the far-infrared ray transmitting member 8 in an optical axis of the far-infrared camera. The details are described below with reference to the drawings.

Figure 5:
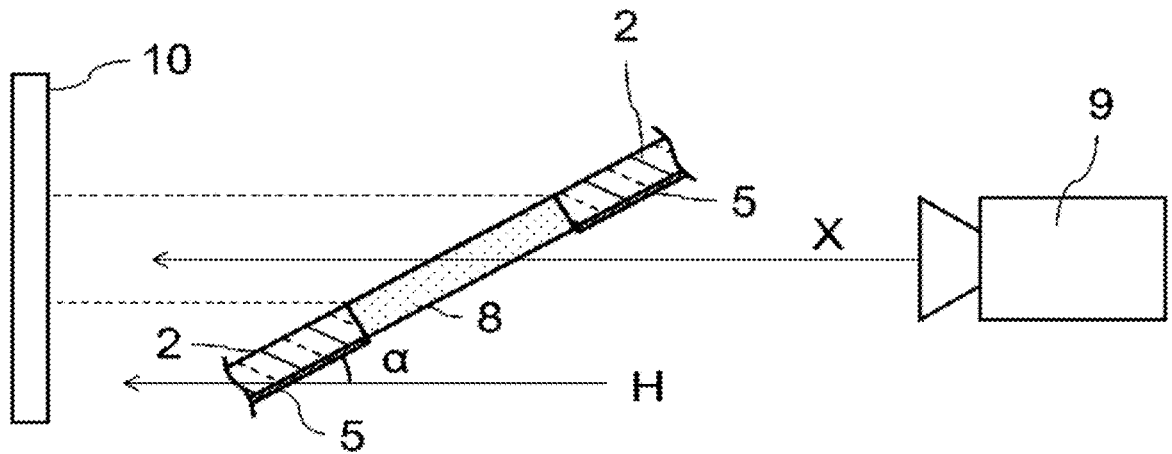
FIG. 5 is a schematic cross-sectional view explaining a positional relation between the vehicular exterior member according to the embodiment of the present invention and a far-infrared camera.
Figure 6:
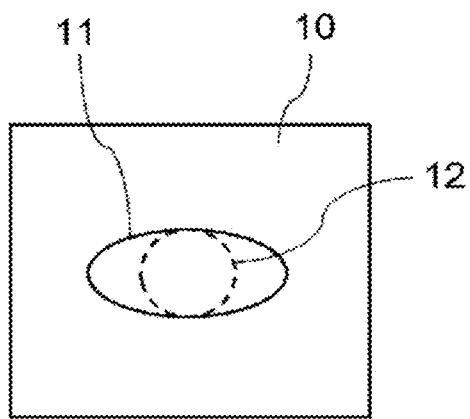
FIG. 6 is a schematic view explaining a projected shape in relation to FIG. 5.

FIG. 5 is an enlarged cross-sectional view of a portion around the far-infrared ray transmitting region 6 in the window member 1. The window member 1 is generally attached to the vehicle in such a manner as to be tilted at a certain angle α with respect to a horizontal direction H. A far-infrared camera 9 is generally attached such that an optical axis X is almost horizontal. The radiation amount of far-infrared rays reaching the far-infrared camera 9 depends on not only the size of the far-infrared ray transmitting member 8 but also the tilt angle α. With consideration of this fact, it is appropriate to examine the size of a projected shape 11 is examined, the projected shape 11 is obtained by projecting, in the optical axis X of the far-infrared camera 9, the far-infrared ray transmitting member 8 on a projection surface 10 perpendicular to the optical axis X when the radiation amount of far-infrared rays reaching the far-infrared camera 9 is examined. The viewing field of the far-infrared camera 9 generally has a circular shape. It is thus appropriate to examine the size of a circle 12 that is the largest in circles formed inside the projected shape 11. FIG. 6 is a schematic view explaining the projected shape 11 projected on the projection surface 10 in FIG. 5, and the circle 12 that is the largest circle in the circles formed inside the projected shape 11.

The inventors had repeated experiments and found that, when the diameter of the circle 12, which is the largest circle in the circles formed inside the projected shape 11, is smaller than 12 mm, the radiation amount of far-infrared rays reaching the far-infrared camera 9 is reduced, causing the occurrence of luminance reduction and a blur in the obtained thermal image, thereby making it difficult to sufficiently ensure sharpness of the thermal image.

In the window member 1 in the embodiment, the diameter of the circle 12, which is the largest circle in the circles formed inside the projected shape 11 obtained by projecting the far-infrared ray transmitting member 8 in the optical axis direction X of the far-infrared camera 9, is equal to or larger than 12 mm, preferably equal to or larger than 20 mm, and more preferably equal to or larger than 30 mm.

The projected shape 11 obtained by projecting the far-infrared ray transmitting member 8 in the optical axis X direction of the far-infrared camera 9 is the drawing obtained by projecting, in the optical axis X, the shape of the surface on the vehicle exterior side of the far-infrared ray transmitting member 8 on the plane perpendicular to the optical axis X.

Figure 7:
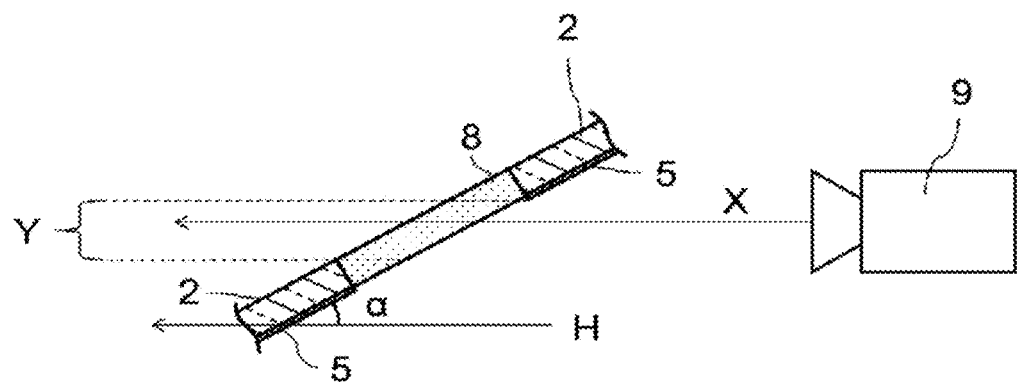
FIG. 7 is another schematic cross-sectional view explaining a positional relation between the vehicular exterior member according to the embodiment of the present invention and the far-infrared camera.

Although depending on the size of the far-infrared ray transmitting member 8 and the thickness of the glass base body 2, the following inconveniences occur when an angle α is too small that is the tilt of the window member 1 in the embodiment with respect to the horizontal line when the window member 1 is attached to the vehicle. In a case where the angle α is too small, a region where only the far-infrared ray transmitting member 8 is included, i.e., a region where the glass base body and the light blocking layer are not included (a region Y in FIG. 7), becomes small when the window member 1 is observed in a direction parallel to the optical axis X. When a region Y is too small, the sharpness of the thermal image obtained by the far-infrared camera likely not to be sufficiently ensured. The angle α at which the region Y will not become too small is thus selected as appropriate.

Figure 8:
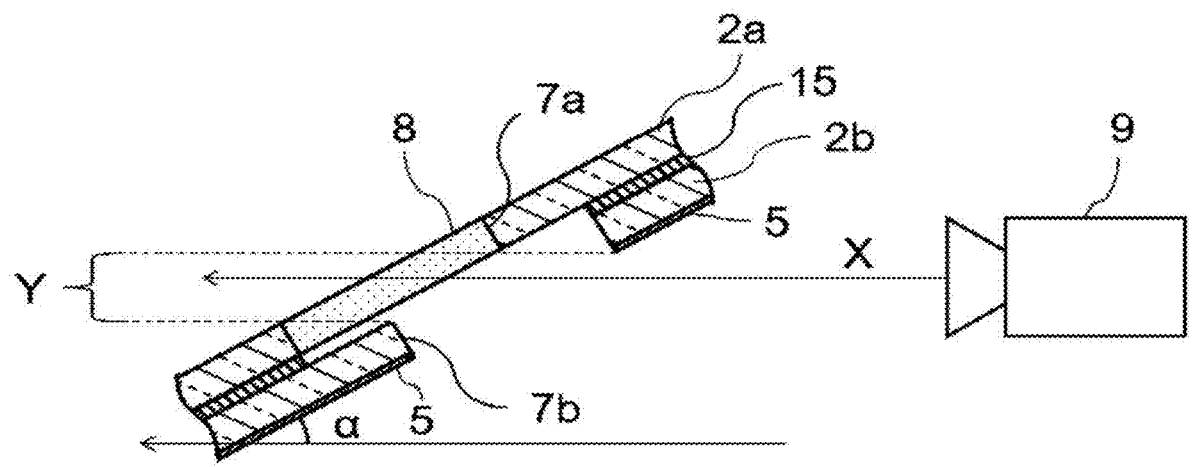
FIG. 8 is another schematic cross-sectional view explaining a positional relation between the vehicular exterior member according to the embodiment of the present invention and the far-infrared camera.

As illustrated in FIG. 8, when the glass base body is the laminated glass including the first glass 2a (on the vehicle exterior side) and the second glass 2b (on the vehicle interior side), the center of the opening 7a of the first glass 2a and the center of the opening 7b of the second glass 2b may be shifted as appropriate. This structure eliminates the need to make the openings 7a and 7b excessively large for securing the size of the region Y even when particularly the angle α is small, thereby achieving particularly both high strength and high sharpness.

The window member 1 in the embodiment preferably further includes, in the light blocking region 3, a visible light transmitting region 13 having a visible light transmittance equal to or larger than 70%. Provision of the visible light transmitting region 13 allows attaching of a visible light camera that images the outside through the visible light transmitting region 13.

The attaching of the visible light camera in addition to the far-infrared camera makes it possible to combine pieces of information obtained by the two cameras and recognize information about the outside of the vehicle, thereby helping with increasing accuracy of object recognition. When the far-infrared ray transmitting region 6 and the visible light transmitting region 13 are arranged in the light blocking region 3, the far-infrared camera and the visible light camera can be attached close to each other, which reduces a load in arithmetic processing of pieces of data obtained from each camera, and allows preferable routing of a power source and signal cables.

The visible light transmitting region 13 is a region where the light blocking layer 5 is not provided in part of the light blocking region 3.

The window member 1 in the embodiment may further include a LiDAR sensor and a millimeter wave radar besides the visible light camera.

<Far-Infrared Camera Equipped Vehicular Exterior Member>

The following describes a far-infrared camera equipped vehicular exterior member of the present invention.

Figure 9:
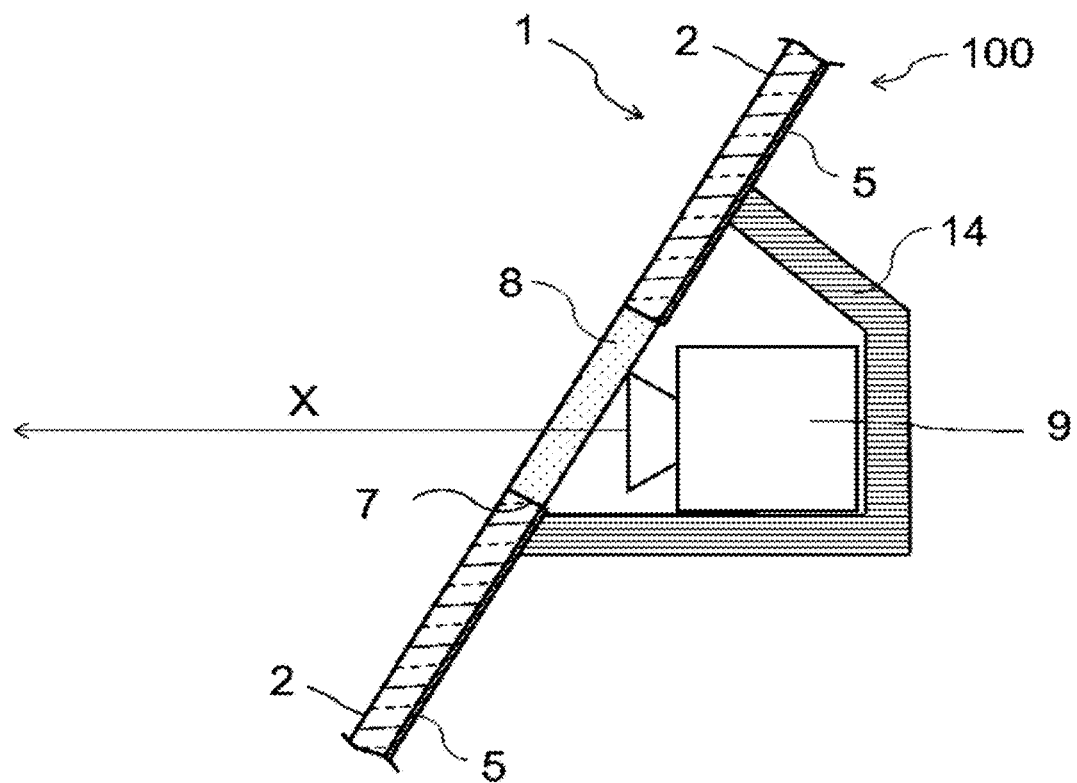
FIG. 9 is a schematic cross-sectional view of an embodiment of a far-infrared camera equipped vehicular exterior member according to the present invention.

FIG. 9 is a schematic cross-sectional view of an embodiment of the far-infrared camera equipped vehicular exterior member of the present invention. This far-infrared camera equipped vehicular exterior member 100 according to the embodiment is a far-infrared camera equipped window member, in which the far-infrared camera 9 is attached to the window member 1 applied to the front windshield of the vehicle.

The vehicular exterior member in the embodiment is not limited to the window member applied to the front windshield of the vehicle, likewise as described above.

The far-infrared camera equipped window member 100 in the embodiment includes the window member 1 and the far-infrared camera 9. The window member 1 is already described. The far-infrared camera 9 is attached to the window member 1 in such a manner as to be capable of imaging external thermal images through the far-infrared ray transmitting region of the window member 1.

The type of the far-infrared camera 9 is not limited to a specific type, and known far-infrared cameras can be used. The far-infrared camera 9 is attached to the window member 1 with a bracket 14, for example. The far-infrared camera 9 is generally attached such that the optical axis X is substantially horizontal.

In order to make the image (thermal image) obtained by the far-infrared camera 9 sharp, the temperature of the far-infrared camera 9 is preferably kept constant.

One of the methods of keeping the temperature of the far-infrared camera 9 constant is to achieve high heat insulating property inside the bracket 14. For achieving a high heat insulating property inside the bracket 14, the inside of the bracket 14 may be kept vacuum or the inside of the bracket 14 may be filled with a heat insulator. It is preferable for the far-infrared camera equipped window member 100 in the embodiment that the far-infrared camera 9 be attached to the window member 1 via through bracket 14 and the inside of the bracket 14 be kept vacuum or filled with a heat insulator.

Another method of keeping the temperature of the far-infrared camera 9 constant is to adjust the temperature inside the bracket 14 by a temperature controller. It is preferable for the far-infrared camera equipped window member 100 in the present embodiment to include the far-infrared camera 9 that is attached to the window member through the bracket 14 and further include a temperature controller to adjust the temperature inside the bracket 14.

When the window member 1 has the visible light transmitting region 13, it is preferable for the far-infrared camera equipped window member 100 in the present embodiment to further include the visible light camera that is attached to the window member 1 so as to be able to image external images through the visible light transmitting region 13.

Providing the visible light camera in addition to the far-infrared camera makes it possible to combine pieces of information obtained by the two cameras and recognize information about the outside of the vehicle, as described above.

In this case, it is preferable that the optical axis of the far-infrared camera and the optical axis of the visible light camera be substantially in parallel, and the distance between the optical axes be equal to or smaller than 20 cm. The term substantially in parallel includes not only a case where those optical axes are completely in parallel but also a case where those optical axes are slightly out of parallel within a degree of an error. Being substantially in parallel allows the optical axis of the far-infrared camera and the center of the viewing field of the visible light camera to substantially coincide, and is preferable for information processing with images obtained from those cameras being combined.

The visible light camera may be a stereo camera including a first camera and a second camera. In this case, the far-infrared camera is preferably disposed between the first and the second cameras. It is also preferable that the optical axes of the far-infrared camera and the first and second cameras be substantially in parallel, and the distance between the optical axes of any two of the three cameras be equal to or smaller than 20 cm.

The LiDAR sensor and a millimeter wave radar may be further included beside the visible light camera, for example. In this case, those sensors are preferably arranged adjacent to one another while signal interference is prevented.

EXAMPLES

The following describes the present invention specifically with examples. The present invention is, however, not limited to the examples.

<Preparation of Far-Infrared Ray Transmitting Member>

Cylindrical far-infrared ray transmitting members (far-infrared ray transmitting members A to Q), each of which includes any one of Si, Ge, ZnS, and chalcogenide glass, and shaped in a column with a different size, were prepared. The material, a diameter L, and a thickness t of each of the far-infrared ray transmitting members are illustrated in Tables 1 to 3.

The far-infrared ray transmitting member J was made as follows. A glass raw material was mixed to have a composition expressed as an atomic percentage as follows: Ga is 6.0%, Sb is 24.0%, Sn is 4.0%, S is 62.0%, Cs is 2.0%, and Cl is 2.0%. The mixed material was sealed in a quartz glass tube having an inner diameter of 25 mm, and then heated to 750° C. and melted for four hours. The melted glass was rapidly cooled and then slowly cooled. The resulting ingot was cut together with the quartz glass tube and polished. As a result, the far-infrared ray transmitting member J was obtained.

A five-layer antireflection film including Ge, Si, and $YF_3$ was formed on the surface on the vehicle exterior side of the far-infrared ray transmitting member O by a vapor deposition method. A two-layer antireflection film including DLC and Si was formed on the surface on the vehicle exterior side of the far-infrared ray transmitting member P, and a five-layer antireflection film including ZnS and Ge was formed on the surface on the vehicle interior side of the far-infrared ray transmitting member P by the vapor deposition method. A single layer of antireflection film including DLC was formed on the surface on the vehicle exterior side of the far-infrared ray transmitting member Q and a two-layer antireflection film including ZnS and Ge was formed on the surface on the vehicle interior side of the far-infrared ray transmitting member Q by the vapor deposition method.

<Measuring Average Transmittance of Far-Infrared Rays Having a Wavelength Ranging from 8 to 13 μm>

Figure 10:
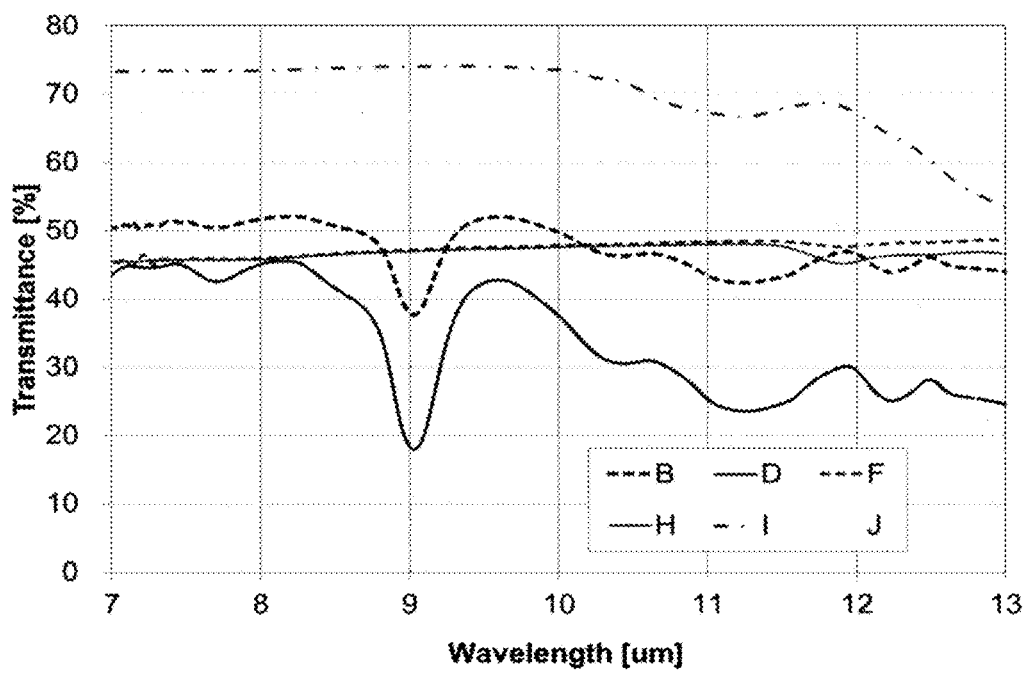
FIG. 10 is infrared ray transmission spectra of far-infrared ray transmitting members B, D, F, H, I, and J in examples.

An infrared ray transmission spectrum of each far-infrared ray transmitting member was measured by a Fourier transformation infrared spectroscopy (product name: Nicolet iS10 manufactured by Thermo Scientific) and the average transmittance of far-infrared rays having a wavelength ranging 8 to 13 μm was obtained from the infrared ray transmission spectrum. The results are illustrated in Tables 1 and 2. FIG. 10 illustrates the infrared ray transmission spectra of the far-infrared ray transmitting members B, D, F, H, I, and J.

<Manufacturing of Window Member>

Example 1

A laminated glass was prepared that included two soda lime glass sheets each having a size of 300 mm square and a thickness of 2.0 mm, and PVB having a thickness of 0.76 mm interposed between the two glass sheets. A through hole having a diameter of 14 mm was formed at the position apart from the center of the laminated glass by 100 mm in the direction toward the side of the glass sheet, the position serving as the center of the through hole.

The far-infrared ray transmitting member A was attached to the through hole in such a manner as to be flush with the surface on the outside of the glass sheet with a urethane-based adhesive. As a result, the window member in example 1 was obtained. The urethane-based adhesive was dried for 5 days at ordinary temperature to be hardened.

Examples 2 and 3

The window members in examples 2 and 3 were obtained in the same manner as example 1 except for that the diameter of the through hole was 26.5 mm and the far-infrared ray transmitting member B and C were attached respectively.

Example 4

The window member in example 4 was obtained in the same manner as example 3 except for that an acrylic adhesive was used. The acrylic adhesive was dried at 120° C. for 1 hour, and was dried at ordinary temperature for 5 days to be hardened.

Examples 5 to 8

The window members in examples 5 to 8 were obtained in the same manner as example 2 except for that the far-infrared ray transmitting members D to G were attached respectively.

Example 9

The window member in example 9 was obtained in the same manner as example 8 except for that an acrylic adhesive was used. The acrylic adhesive was dried at 120° C. for 1 hour, and was dried at ordinary temperature for 5 days to be hardened.

Examples 10 to 13

The window members in examples 10 to 13 were obtained in the same manner as example 2 except for that the far-infrared ray transmitting members H to K were attached respectively.

Examples 14 and 15

The window members in examples 14 and 15 were obtained in the same manner as example 1 except for that the diameter of the through hole was 51.5 mm and the far-infrared ray transmitting members L and M were attached respectively.

Example 16

The window member in example 16 was obtained in the same manner as example 1 except for that the diameter of the through hole was 91.5 mm and the far-infrared ray transmitting member N was attached.

Examples 17 to 19

The window members in examples 17 to 19 were obtained in the same manner as example 1 except for that the diameter of the through hole was 51.5 mm and the far-infrared ray transmitting members O, P, and Q were attached respectively.

<Ball Drop Strength Evaluation>

Ball drop strength evaluations 1 and 2 described below were done using the window members in examples 1 to 19. The window material that was passed in both tests was evaluated as "passed" while the window material that was failed in either one of the tests was evaluated as "failed". The evaluation results are illustrated in Tables 1 and 2. (Ball drop strength evaluation 1)

The evaluation was done using a ball drop device and a supporting frame in compliance with the impact resistance test in JIS R3211 and 3212-2015.

The window member was kept in a room under conditions of a temperature of 23° C. and a relative humidity of 50% for 4 hours, and then was fixed by the supporting frame such that the surface outside the window member faces upward. A steel ball of 226 g was dropped onto the center of the window member from a height of 10 m. When the steel ball did not pass through the window member and the total weight of peeled off fragments from the side opposite the impacted surface was equal to or smaller than 15 g, the window member was determined to be accepted. (Ball drop strength evaluation 2)

The test was done in the same manner as the ball drop evaluation 1 except for that a steel ball of 509 g was used. When the far-infrared ray transmitting member was not broken or was not removed from the window member, and the total weight of peeled off fragments from the side opposite the impacted surface was equal to or smaller than 15 g, the window member was determined to be accepted.

<Thermal Image Visual Recognition Evaluation>

The following thermal image recognition evaluation was done using the window members in examples 1 to 19.

The window member was disposed in such a manner as to make an angle of α with respect to the horizontal surface. A far-infrared ray camera was disposed such that the optical axis was horizontal and coincided with the center of the far-infrared ray transmitting member, and the housing thereof was in contact with the window member. The far-infrared camera was Cube 417 manufactured by Wuhan Guide Infrared Co. Ltd. (resolution: 400×300, horizontal angle of view: 20°, vertical angle of view: 15°, and focal distance: 19 mm).

Figure 11:
FIG. 11 is a thermal image illustrating a positional relation with a pedestrian in a test (thermal image visual recognition evaluation) done in the examples.

As illustrated FIG. 11, the pedestrian located 100 m from the window was imaged by the far-infrared camera at an external temperature of 26° C. An image of 20×30 pixels was cut from the taken thermal image while the pedestrian was located at the center of the image. Each cut image was evaluated by a thermal image contrast as a ratio of "the maximum luminance/the minimum luminance" by image analysis. As larger the value of the thermal image contrast is, the sharper the taken image is. When the value of the thermal image contrast is equal to or larger than 3.0, the pedestrian located 100 m from the window is sufficiently recognizable.

The window member in example 1 was tested at α=30°, 60°, and 90°.

The window members in example 2, 5, 7, 10, 12, 13, and 19 were tested at α=30° and 45°.

The window members in example 3, 6, 8, 11, and 14 to 18 were tested at α=30°.

The window members in examples 4 and 9, in which only the type of the adhesive is different from that in examples 3 and 8, were not tested because it was considered that the window members in examples 4 and 9 have the same thermal image visual recognition evaluation results as those in examples 3 and 8.

Tables 1 and 2 illustrate the values of α, the values of the diameter R of the largest circle in the circles formed inside the projected shape obtained by projecting the far-infrared ray transmitting member in the optical axis direction, and the values of the thermal image contrast.

Figure 12:
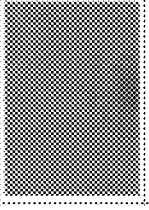
FIG. 12 is the thermal images of the cut images including the pedestrian in example 1 ($\alpha=30°$ and 60°), example 5 ($\alpha=30°$), example 10 ($\alpha=30°$ and 45°), example ($\alpha=30°$), example 13 ($\alpha=30°$), and example 15 ($\alpha=$) 30° in the test (thermal image visual recognition evaluation) done in the examples.

FIG. 12 illustrates the thermal images of the cut images including the pedestrian in example 1 (α=30° and) 60°, example 5 (α=30°), example 10 (α=30° and 45°), example 12 (α=30°), example 13 (α=30°), and example 15 (α=30°).

TABLE 1

| | | Example 1 | | | Example 2 | | Example 3 | Example 4 | Example 5 | Example 6 | Example 7 | |
|---|---|---|---|---|---|---|---|---|---|---|---|---|
| Structure of far-infrared transmitting member | Far-infrared ray transmitting member | A | | | B | | C | C | D | E | F | |
| | Material | Si | | | Si | | Si | Si | Si | Si | Ge | |
| | L [mm] | 12.5 | | | 25 | | 25 | 25 | 25 | 25 | 25 | |
| | t [mm] | 2 | | | 1 | | 2 | 2 | 3 | 5 | 1 | |
| | Average transmittance [%] | 39 | | | 47 | | 39 | 39 | 33 | 14 | 48 | |
| | Adhesive | Urethane | | | Urethane | | Urethane | Acrylic | Urethane | Urethane | Urethane | |
| Ball drop strength evaluation | Evaluation result | Passed | | | Failed | | Passed | Passed | Passed | Passed | Failed | |
| Thermal image visual recognition result | α [°] | 30 | 60 | 90 | 30 | 45 | 30 | — | 30 | 45 | 30 | 30 | 45 |
| | R [mm] | 6.3 | 10.8 | 12.5 | 12.5 | 17.7 | 12.5 | — | 12.5 | 17.7 | 12.5 | 12.5 | 17.7 |
| | Thermal image contrast | 1.3 | 2 | 3.2 | 4.1 | 10.7 | 4.9 | — | 7.7 | 8.1 | 2.4 | 7.4 | 11.4 |

TABLE 2

| | | Example 8 | Example 9 | Example 10 | Example 11 | Example 12 | Example 13 | Example 14 | Example 15 | Example 16 |
|---|---|---|---|---|---|---|---|---|---|---|
| Structure of far-infrared transmitting member | Far-infrared ray transmitting member | G | G | H | I | J | K | L | M | N |
| | Material | Ge | Ge | Ge | Ge | chalcogenide glass | ZnS | Si | Si | Si |
| | L [mm] | 25 | 25 | 25 | 25 | 25 | 25 | 50 | 50 | 90 |
| | t [mm] | 2 | 2 | 3 | 5 | 2 | 3 | 1 | 2 | 3 |

TABLE 2-continued

|  |  | Example 8 | Example 9 | Example 10 | | Example 11 | Example 12 | Example 13 | | Example 14 | | Example 15 | Example 16 |
|---|---|---|---|---|---|---|---|---|---|---|---|---|---|
|  | Average transmittance [%] | 47 | 47 | 47 | | 45 | 58 | 70 | | 47 | | 39 | 33 |
| Ball drop strength evaluation | Adhesive Evaluation result | Urethane Passed | Acrylic Passed | Urethane Passed | | Urethane Passed | Urethane Passed | Urethane Passed | | Urethane Failed | | Urethane Passed | Urethane Failed |
| Thermal image visual recognition result | α [°] | 30 | — | 30 | 45 | 30 | 30 | 45 | 30 | 45 | 30 | 30 | 30 |
|  | R [mm] | 12.5 | — | 12.5 | 17.7 | 12.5 | 12.5 | 17.7 | 12.5 | 17.7 | 25.0 | 25.0 | 45.0 |
|  | Thermal image contrast | 6.5 | — | 4.8 | 11.4 | 5.2 | 4 | 6.1 | 200 | 28.2 | 26.5 | 9.9 | 7.8 |

TABLE 3

|  |  | Example 17 | Example 18 | Example 19 | |
|---|---|---|---|---|---|
| Structure of far-infrared transmitting member | Far-infrared ray transmitting member | O | P | Q | |
|  | Material | Ge | ZnS | Si | |
|  | L [mm] | 50 | 30 | 50 | |
|  | t [mm] | 2 | 2 | 2 | |
|  | Average transmittance [%] | 91 | 88 | 68 | |
| Ball drop strength evaluation | Adhesive Evaluation result | Urethane Passed | Urethane Passed | Urethane Passed | |
| Thermal image visual recognition result | α [°] | 30 | 30 | 30 | 45 |
|  | R [mm] | 25.0 | 15.0 | 25.0 | 35.4 |
|  | Thermal image contrast | 13.2 | 6.7 | 13.4 | 18.9 |

The following describes the results of the ball drop strength evaluation of the examples.

The strength was insufficient in example 2, 7, and 14, which used the far-infrared ray transmitting members B, F, and L, each having the thickness t of 1 mm, respectively.

The strength was insufficient in example 16, which used the far-infrared ray transmitting member N having the diameter L of 90 mm and the thickness t of 3 mm.

In contrast, the strength was sufficiently high in examples 1, 3 to 6, 8 to 13, 15, and 17 to 19, which used the far-infrared ray transmitting members A, C to E, G to K, M, and O to Q, each having the thickness t of 1.5 mm or more and the diameter L of 80 mm or less, respectively.

The following describes the results of the thermal image visual recognition evaluation of the examples.

In example 1, the thermal image contrast was insufficient and the sharpness of the thermal image was low as illustrated in FIG. 12 in the test where α=30° and the R=6.3 mm and in the test where α=60° and the R=10.8 mm. In contrast, in the test where α=90° and the R=12.5 mm in example 1, the thermal image contrast was sufficient.

The thermal image contrast was insufficient in the test in example 6 where the far-infrared ray transmitting member E was used. The average transmittance of far-infrared rays having a wavelength ranging from 8 to 13 μm of the far-infrared ray transmitting member E was 14%.

The thermal image contrast was sufficient in the tests in examples 2, 3, 5, 7, 8, and from 10 to 19, in each of which R was 12 mm or more, and the average transmittance of far-infrared rays having a wavelength ranging from 8 to 13 μm of the far-infrared ray transmitting member was 25% or more.

As apparent from the results described above, the far-infrared ray transmitting member had both high strength and sufficient thermal image contrast when the far-infrared ray transmitting member satisfied the following conditions. The thickness t was equal to or larger than 1.5 mm, the diameter L was equal to or smaller than 80 mm, the average transmittance of far-infrared rays having a wavelength ranging from 8 to 13 μm was equal to or larger than 25%, and the diameter R of the largest circle in the circles formed inside the projected shape obtained by projecting the far-infrared ray transmitting member in the optical axis direction was equal to or larger than 12 mm.

The international application claims the priority of Japanese Patent Application No. 2019-136326, filed on Jul. 24, 2019, and all contents of which are incorporated herein.

REFERENCE SIGNS LIST 1 vehicular exterior member (window member)
2 glass base body
2a first glass
2b second glass
3 light blocking region
4 light transmitting region
5 light blocking layer
6 far-infrared ray transmitting region
7 opening
7a opening of first glass
7b opening of second glass
8 far-infrared ray transmitting member
9 far-infrared camera
10 projection surface
11 projected shape
12 largest circle in circles formed inside projected shape
13 visible light transmitting region
14 bracket
15 intermediate layer
100 far-infrared camera equipped window member
X optical axis

The invention claimed is:

1. A far-infrared camera equipped vehicular exterior member, comprising:
   a vehicular exterior member;
   a far-infrared camera attached to the vehicular exterior member and configured to image an external thermal image through a far-infrared ray transmitting region; and
   a visible light camera attached to the vehicular exterior member and configured to image an external image through a visible light transmitting region, wherein the vehicular exterior member includes an exterior member having a light blocking region and an opening formed in the light blocking region such that the exterior member is configured to be attached to a vehicle equipped with a far-infrared camera, and a far-infrared ray transmitting member formed in the opening of the exterior member and forming far-infrared ray transmitting region in the light blocking region of the exterior member, the far-infrared ray transmitting member is formed such that an average transmittance of far-infrared rays having a wavelength ranging from 8 to 13 μm is equal to or larger than 25%, a length of the longest straight line, in straight lines connecting any desired two points on a surface on a vehicle exterior side of the far-infrared ray transmitting member, is equal to or smaller than 80 mm, a diameter of the largest circle, in circles formed in a projected shape obtained by projecting the far-infrared ray transmitting member in an optical axis direction of the far-infrared camera, is equal to or larger than 12 mm, and an average thickness is equal to or larger than 1.5 mm, and a visible light transmitting region is provided in the light blocking region having a visible light transmittance equal to or larger than 70%.

2. The far-infrared camera equipped vehicular exterior member according to claim 1, wherein an optical axis of the far-infrared camera and the optical axis of the visible light camera are substantially in parallel, and a distance between the optical axes is equal to or smaller than 20 cm.

3. The far-infrared camera equipped vehicular exterior member according to claim 1, wherein the visible light camera is a stereo camera including a first camera and a second camera, and the far-infrared camera is positioned between the first and the second cameras.

4. The far-infrared camera equipped vehicular exterior member according to claim 1, wherein the far-infrared camera is attached to the vehicular exterior member with a bracket interposed therebetween, and an inside of the bracket is kept vacuum or filled with a heat insulator.

5. The far-infrared camera equipped vehicular exterior member according to claim 1, wherein the far-infrared camera is attached to the vehicular exterior member with a bracket interposed therebetween, and the far-infrared camera equipped vehicular exterior member further includes a temperature controller for adjusting a temperature inside the bracket.

6. The far-infrared camera equipped vehicular exterior member according to claim 1, wherein the far-infrared ray transmitting member includes at least one material selected from the group consisting of ZnS, Ge, Si, and chalcogenide glass.

7. The far-infrared camera equipped vehicular exterior member according to claim 1, wherein the far-infrared ray transmitting member has an antireflection film positioned on at least one of the surface on the vehicle exterior side and a surface on a vehicle interior side of the far-infrared ray transmitting member such that the antireflection film includes one to twelve layers including a diamond-like carbon film on the most vehicle exterior side of the antireflection film.

8. The far-infrared camera equipped vehicular exterior member according to claim 1, wherein the surface on the vehicle exterior side of the far-infrared ray transmitting member is formed flush with a surface on the vehicle exterior side of the light blocking region.

9. The far-infrared camera equipped vehicular exterior member according to claim 1, wherein the far-infrared ray transmitting member is attached with at least one of a urethane-based adhesive and an acrylic adhesive.

10. The far-infrared camera equipped vehicular exterior member according to claim 1, wherein an area of the opening on a surface on a vehicle interior side is smaller than the area of the opening on a surface on the vehicle exterior side.

11. The far-infrared camera equipped vehicular exterior member according to claim 1, wherein the exterior member is a vehicular window member.

12. The far-infrared camera equipped vehicular exterior member according to claim 1, wherein the exterior member is a vehicular pillar.

13. The far-infrared camera equipped vehicular exterior member according to claim 2, wherein the far-infrared ray transmitting member includes at least one material selected from the group consisting of ZnS, Ge, Si, and chalcogenide glass.

14. The far-infrared camera equipped vehicular exterior member according to claim 2, wherein the far-infrared ray transmitting member has an antireflection film positioned on at least one of the surface on the vehicle exterior side and a surface on a vehicle interior side of the far-infrared ray transmitting member such that the antireflection film includes one to twelve layers including a diamond-like carbon film on the most vehicle exterior side of the antireflection film.

15. The far-infrared camera equipped vehicular exterior member according to claim 2, wherein the surface on the vehicle exterior side of the far-infrared ray transmitting member is formed flush with a surface on the vehicle exterior side of the light blocking region.

16. The far-infrared camera equipped vehicular exterior member according to claim 2, wherein the far-infrared ray transmitting member is attached with at least one of a urethane-based adhesive and an acrylic adhesive.

17. The far-infrared camera equipped vehicular exterior member according to claim 2, wherein an area of the opening on a surface on a vehicle interior side is smaller than the area of the opening on a surface on the vehicle exterior side.

18. The far-infrared camera equipped vehicular exterior member according to claim 2, wherein the exterior member is a vehicular window member.

19. The far-infrared camera equipped vehicular exterior member according to claim 2, wherein the exterior member is a vehicular pillar.

20. The far-infrared camera equipped vehicular exterior member according to claim 2, wherein the visible light camera is a stereo camera including a first camera and a second camera, and the far-infrared camera is positioned between the first and the second cameras.

* * * * *